US012178766B2

(12) United States Patent
Buczek

(10) Patent No.: US 12,178,766 B2
(45) Date of Patent: Dec. 31, 2024

(54) MOVABLE BACK SUPPORT WITH MECHANICALLY ADVANTAGED ADJUSTMENT

(71) Applicant: Paul Buczek, Irvine, CA (US)

(72) Inventor: Paul Buczek, Irvine, CA (US)

(73) Assignee: Convaid by Etac, Torrance, CA (US)

(*) Notice: Subject to any disclaimer, the term of this patent is extended or adjusted under 35 U.S.C. 154(b) by 108 days.

(21) Appl. No.: 18/073,757

(22) Filed: Dec. 2, 2022

(65) Prior Publication Data

US 2024/0180762 A1 Jun. 6, 2024

(51) Int. Cl.
*A61G 5/10* (2006.01)
*A61G 5/12* (2006.01)

(52) U.S. Cl.
CPC ......... *A61G 5/1067* (2013.01); *A61G 5/1064* (2013.01); *A61G 5/122* (2016.11); *A61G 5/1048* (2016.11)

(58) Field of Classification Search
None
See application file for complete search history.

(56) References Cited

U.S. PATENT DOCUMENTS 5,062,677 A 11/1991 Jay
5,769,490 A * 6/1998 Falzon ................. B60N 2/6671 297/284.3
6,079,785 A * 6/2000 Peterson ................ A47C 7/462 297/284.7
7,437,789 B2 10/2008 Thompson
8,517,469 B1 * 8/2013 Hetzel .................. A61G 5/1067 297/284.4
10,595,639 B2 3/2020 DuFresne
2005/0001461 A1 * 1/2005 Caruso ..................... A47C 3/12 297/258.1
2017/0112288 A1 * 4/2017 DuFresne ............ A61G 5/1048
2021/0307980 A1 * 10/2021 Hetzel .................. A61G 5/1067

FOREIGN PATENT DOCUMENTS

CA 3113995 10/2021
CN 201920416269 3/2020

OTHER PUBLICATIONS

Acta-Relief Back Support for Wheelchairs by Comfort Company.
TIMBAKBO: LSO Back Brace with Maximum Decompression Plate&Adjustable Arch BackSupport,Pulley System Lumbar Support Belt for Herniated Disc Pain Relief,SpineStenosis,Sciatica,Scoliosis,Lumbar Support for Back Pain.

* cited by examiner

*Primary Examiner* — David E Allred
(74) *Attorney, Agent, or Firm* — Fish IP Law, LLP

(57) ABSTRACT

Movable back supports that can be moved in many different axes about a seat and fixed in a position desired by a user are contemplated. Movable back supports comprise sliding members, straps, and a tightening mechanism that alters tension in the straps. Contemplated movable back supports can be positioned at a desired height relative to a backrest and at a desired distance from backrest rails of the seat. Furthermore, contemplated movable back supports can be moved forwardly into a back of a user or rearwardly away from the back of the user.

12 Claims, 5 Drawing Sheets

MOVABLE BACK SUPPORT WITH MECHANICALLY ADVANTAGED ADJUSTMENT

FIELD OF THE INVENTION

The field of the invention is support devices, and more particularly to movable back supports for seats (e.g., a seat of a wheelchair, a chair, etc.).

BACKGROUND

The background description includes information that may be useful in understanding the present invention. It is not an admission that any of the information provided herein is prior art or relevant to the presently claimed invention, or that any publication specifically or implicitly referenced is prior art.

Many people spend a considerable amount of time in a seated position. For example, a person having an office job typically spends hours in a seated position. Mobility issues can also cause a person to be seated for long periods of time (e.g., seated in a wheelchair). Additionally, people are often in a seated position when traveling or commuting. Prolonged sitting can cause back pain and issues. A back support can be used to alleviate or minimize the risk of back pain and issues.

Some have contemplated a back support that attaches to a seat. For example, U.S. Pat. No. 10,595,639 discloses a tensioning assembly attached to a chair. The tensioning assembly is attached to first and second seat back support members of the chair. The tension in the seat back of the chair can be adjusted via the tensioning assembly for comfort and support of the person seated in the chair. In another example, U.S. Pat. No. 7,437,789 discloses a lumbar support pillow having a securing device for mounting onto massage tables, automobile seats, reclining chairs, and wheelchairs. The support pillow comprises fillable chambers that may be filled with a fluid to provide a curvature and degree of lumbar support desired by a person. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Although some have contemplated back supports that attach to seats, there is still a need for improved back supports.

SUMMARY OF THE INVENTION

The inventive subject matter provides apparatus, systems, and methods in which a back support can be positioned vertically and horizontally along a seat to best support a user while seated on the seat. A contemplated movable back support comprises left and right sliding members and left and right straps. The left strap extends between the left sliding member and a left rail of the seat, and the right strap extends between the right sliding member and a right rail of the seat. The left and right straps are configured to be height-adjustable along the left and right rails, respectively. The movable back support further comprises a tightening mechanism configured to mutually slide the left and right sliding members and thereby alter tension in the left and right straps.

The left and right sliding members can each comprise a slot through which the left and right straps extend, respectively. One or more of the left and right straps can be elastic, a band, or a length-adjustable belt (e.g., a belt having a buckle for length adjustments).

The tightening mechanism can be a pulley system. The pulley system can comprise a first pulley coupled to the left sliding member, a second pulley coupled to the right sliding member, and a cord at least partially wrapped around the first and second pulleys. A pull tab can be coupled to the cord. The pull tab can be pulled to cause the left and right sliding members to slide, via the pulley system, and thereby alter tension in the left and right straps. It is contemplated that the left and right sliding members can slide along a back support body of the movable back support. The back support body is sized and dimensioned as a lumbar support.

In another aspect, a wheelchair having a movable back support is contemplated. The movable back support is coupled to left and right backrest rails of the wheelchair. The movable back support comprises left and right sliding members, left and right straps, and a tightening mechanism.

In another yet aspect, a method of positioning a movable back support with respect to a seat is contemplated. The method comprises steps of (i) loosening one or more of left and right adjustment mechanisms of left and right straps, respectively, of the movable back support (e.g., lengthening one or more of the left and right straps), (ii) positioning the left and right straps along left and right backrest rails, respectively, of the seat to position the back support to a desired height relative to a backrest of the seat and a desired distance from the left and right backrest rails (e.g., sliding the left and right straps up or down the left and right backrest rails), (iii) tightening the one or more left and right adjustment mechanisms sufficiently to fix the back support in both the desired height and the desired distance (e.g., shortening one or more of the left and right straps), and (iv) tightening a tightening mechanism to slide left and right sliding members coupled to the left and right straps, respectively, and thereby alter tension in the left and right straps. Besides tightening, the tightening mechanism can be loosened to slide the left and right sliding members, respectively, and thereby reduce tension in the left and right straps.

It is contemplated that the tightening mechanism can be tightened by pulling a pull cord of the tightening mechanism to mutually slide the left and right sliding members towards one another to add tension in the left and right straps. A pulley system of the tightening mechanism can mutually slide the left and right sliding members towards one another as the pull cord is pulled. The pull cord can be released to release tension in the left and right straps and mutually slide the left and right sliding members away from one another.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Movable back supports that attach to a seat to provide support for users are contemplated. The movable back supports can be positioned vertically and horizontally along a rear area of the seat (i.e., up/down and/or left/right along the rear area of the seat). Additionally, movable back supports comprise left and right straps that can be tensioned to position the movable back support toward or away from a user's back (i.e., into or away from the user's back). Thus, users can optimally position the movable back support to best provide the support needed (e.g., lumbar support).

Figure 1:
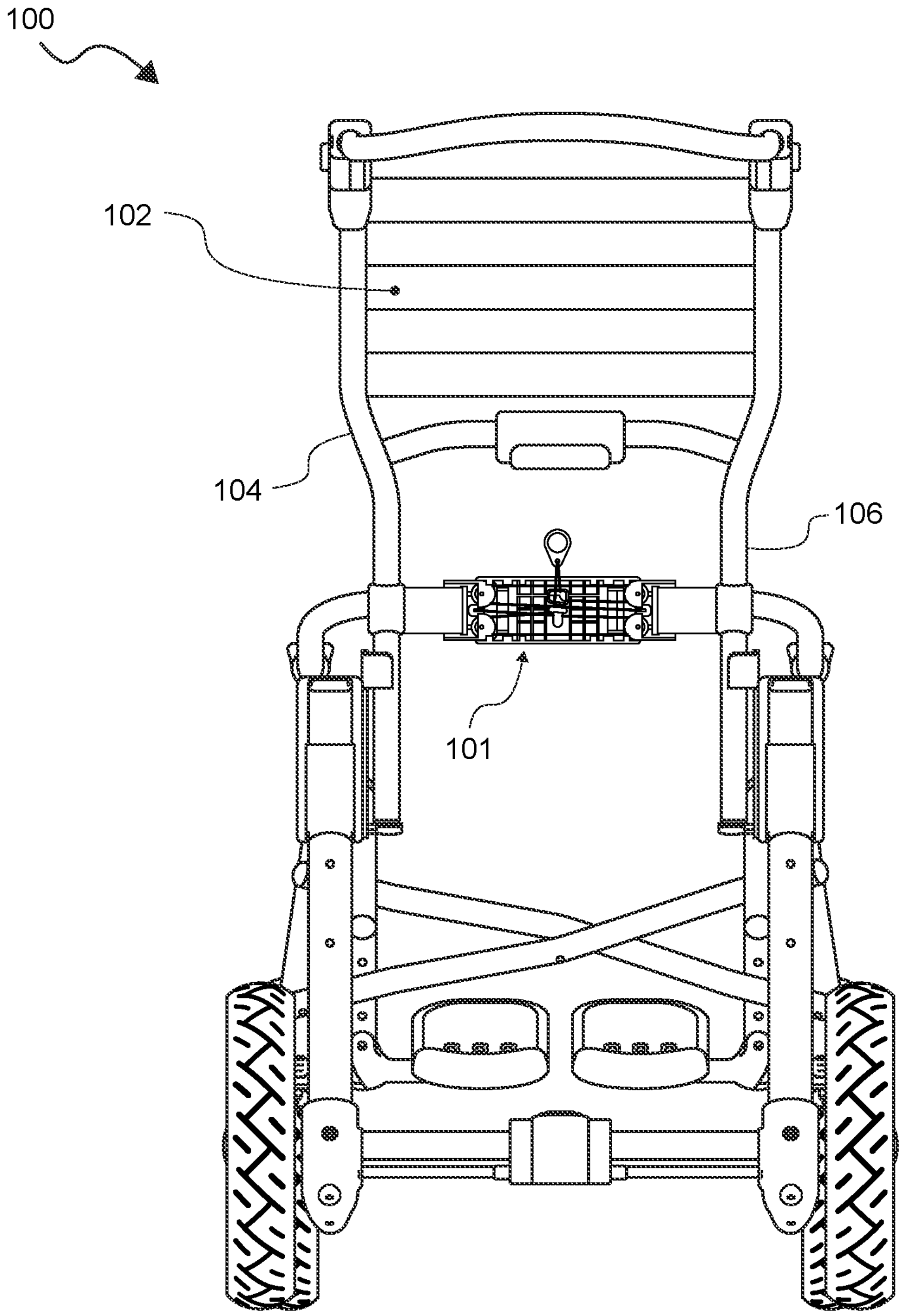
FIG. 1 is a rear view of an embodiment of a wheelchair having a movable back support attached to left and right rails of the wheelchair.

An embodiment of a wheelchair 100 having a movable back support 101 is shown in FIG. 1. Wheelchair 100 comprises a backrest 102, a left rail 104, and a right rail 106. As will be described in further detail below, movable back support 101 can be slid up and down left rail 104 and right rail 106 (i.e., up toward backrest 102 or down away from backrest 102). Additionally, a back support body of movable back support 101 can be positioned closer to left rail 104 or right rail 106. Movable back support 101 can also be move forwardly into a back of a user or rearwardly away from the back of the user. Thus, movable back support 101 can be moved in many different axes and fixed in a position to provide the support needed by the user.

Figure 2:
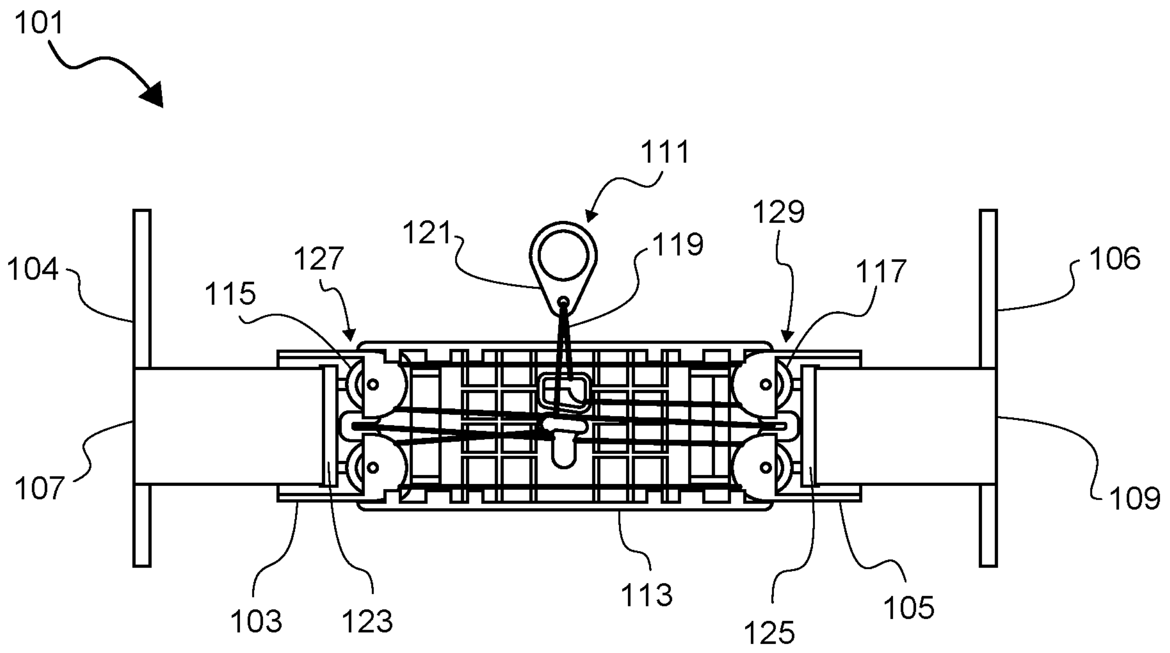
FIG. 2 is a rear view of the movable back support of FIG. 1.

Movable back support 101 comprises a left sliding member 103 and a right sliding member 105 as shown in FIG. 2. Movable back support 101 further comprises a left strap 107 that extends between left sliding member 103 and left rail 104, and a right strap 109 that extends between right sliding member 105 and right rail 106. A tightening mechanism 111 is configured to mutually slide left sliding member 103 and right sliding member 105 to thereby alter tension in left strap 107 and right strap 109.

Tightening mechanism 111 comprises a pulley system as shown in FIG. 2. Pulley system comprises a first pulley 115 coupled to left sliding member 103, a second pulley 117 coupled to right sliding member 105, and a cord 119 is at least partially wrapped around first pulley 115 and second pulley 117. The pulley system further comprises a pull tab 121 coupled to cord 119. As shown in FIG. 2, cord 119 can at least partially wrap around additional pulleys on left sliding member 103 and right sliding member 105. It is contemplated that tightening mechanism can comprise more or less pulleys than what is shown in FIG. 2.

Movable back support 101 comprises a back support body 113 having a left slot 127 and a right slot 129. Left sliding member 103 and right sliding member 105 mutually slide along back support body 113. Left sliding member 103 is configured to slide within left slot 127, and right sliding member 105 is configured to slide within right slot 129. As shown in FIG. 2, left sliding member 103 and right sliding member 105 are disposed on a rear side of back support body 113. A front side of back support body 113 faces a backrest of a seat or a back of a user. It is contemplated that back support body 113 is sized and dimensioned as a lumbar support.

As left sliding member 103 and right sliding member 105 mutually slide along back support body 113, left strap 107 and right strap 109 are stretched or unstretched to alter tension in the left strap 107 and right strap 109. It is contemplated that one or more of left strap 107 and right strap 109 can be clastic.

Figure 3:
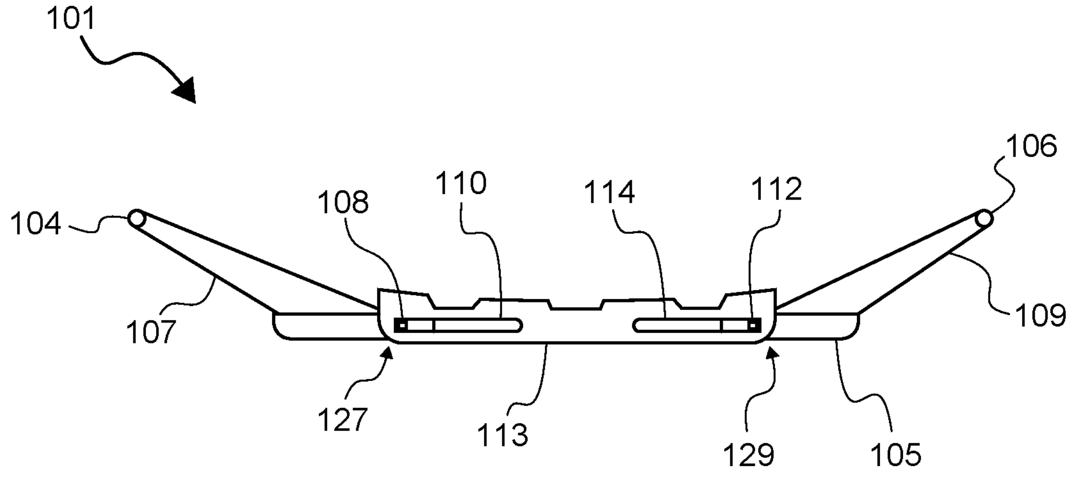
FIG. 3 is a top view of the movable back support of FIG. 1.

Left strap 107 and right strap 109 attach to left sliding member 103 and right sliding member 105, respectively. As shown in FIG. 2, left sliding member 103 comprises a slot 123 and right sliding member 105 comprises a slot 125. Left strap 107 extends through slot 123 to couple left sliding member 103 and right strap 109 extends through slot 125 to couple right sliding member 105. Additionally, left strap 107 extends around left rail 104 and right strap 109 extends around right rail 106 as shown in FIG. 3 to couple movable back support 101 to wheelchair 100. It is contemplated that one or more of left strap 107 and right strap 109 is a band.

As briefly discussed above, movable back support 101 can be moved in many different axes and fixed in a position to provide the support needed by the user. FIGS. 1-2 show movable back support 101 in a fixed position. A user can move movable back support 101 from the fixed position to another position. Left strap 107 can comprise a left adjustment mechanism (e.g., a buckle) and right strap 109 can comprise a right adjustment mechanism (e.g., a buckle). It is contemplated that the left and right adjustment mechanisms can be used to lengthen or shorten left strap 107 and right strap 109, respectively.

One or more of the left and right adjustment mechanisms can be loosened. Once loosened, left strap 107 and right strap 109 can be positioned along left rail 104 and right rail 106, respectively. For example, left strap 107 and right strap 109 can be slid up or down left rail 104 and right rail 106, respectively. Movable back support 101 can be positioned to (1) a desired height relative to backrest 102, and (2) a desired distance from left rail 104 and right rail 106 (e.g., positioned closer to left rail 104 or right rail 106 or equidistant from left rail 104 and right rail 106). One or more of the left and right adjustment mechanisms can be tightened to fix movable back support 101 in both the desired height and the desired distance. To re-position movable back support 101, one or more of the left and right adjustment mechanisms can be loosened and the process described above can be repeated to fix movable back support 101 in a new position.

Besides being height-adjustable along left rail 104 and right rail 106, movable back support 101 can be moved forwardly into a back of a user or rearwardly away from the back of the user. Tightening mechanism 111 can be used to mutually slide left sliding member 103 and right sliding member 105 coupled to left strap 107 and right strap 109, respectively, and thereby alter tension in left strap 107 and right strap 109. It is contemplated that tension is altered by stretching left strap 107 and right strap 109 as left sliding member 103 and right sliding member slide toward one another.

As left strap 107 and right strap 109 are stretched, movable back support 101, and more particularly back support body 113, moves toward the back of a user. It should be appreciated that movable back support 101, and more particularly back support body 113, presses against the user's back to provide support while user is seated on wheelchair 100. The amount of force that movable back support 101 applies as it presses against a user's back can be altered by altering tension in left strap 107 and right strap 109. For example, the amount of force that movable back support 101 applies to a user's back (i) increases as tension is increased in left strap 107 and right strap 109 and (ii) decreases as tension is decreased in left strap 107 and right strap 109.

FIGS. 2-3 show left strap 107 and right strap 109 prior to stretching caused by tightening mechanism. In this relaxed position, left sliding member 103 and right sliding member 105 are spaced apart as shown in FIG. 2. Furthermore, back support body 113 can be moved rearwardly away from left rail 104 and right rail 106, and away from a user's back, as shown in FIG. 3.

Figure 4:
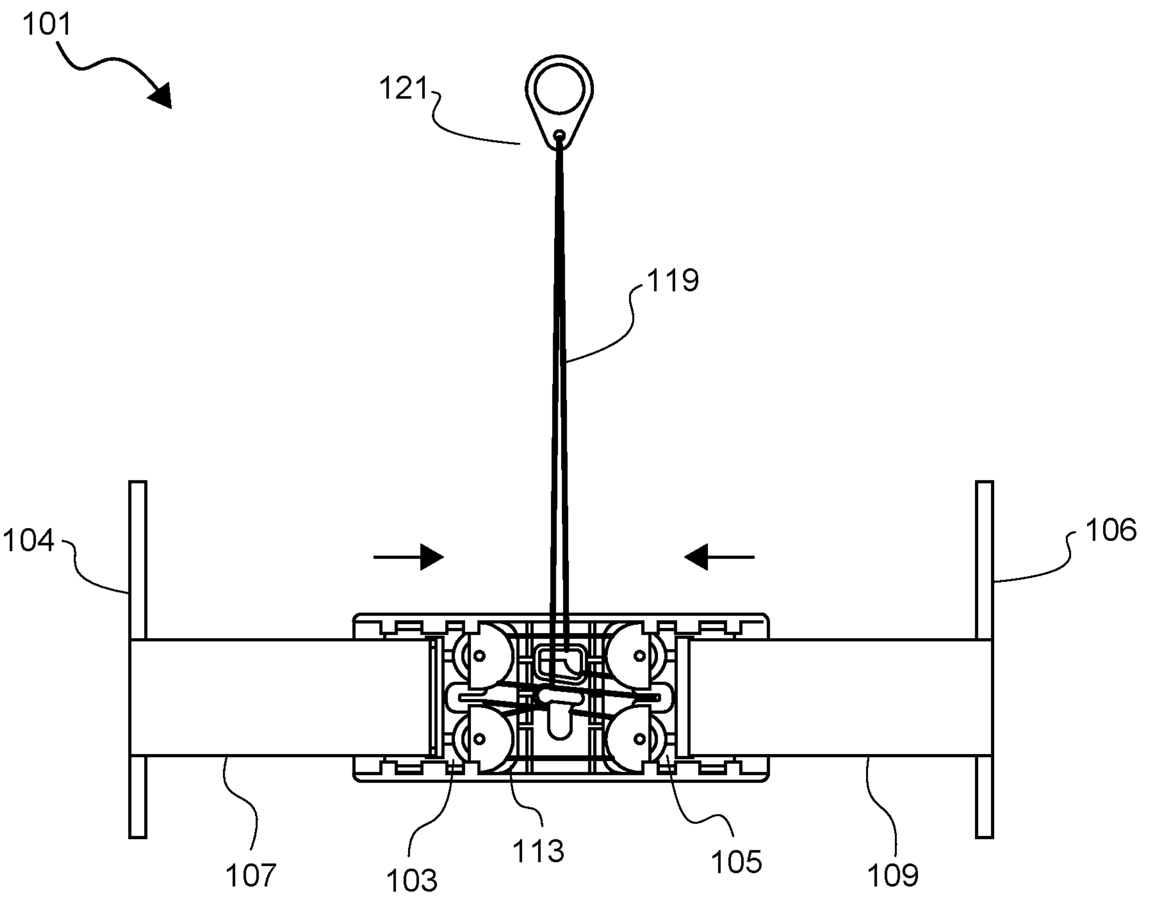
FIG. 4 is another rear view of the movable back support of FIG. 1.

FIG. 4 shows left strap 107 and right strap 109 in a tensioned position. The space between left sliding member 103 and right sliding member 105 is substantially reduced compared to the space between left sliding member 103 and right sliding member 105 when in the relaxed position. Furthermore, left strap 107 and right strap 109 are stretched as shown in FIG. 4. As a result, movable back support 101, and more particularly back support body 113, is moved forwardly toward a user's back as shown in FIG. 5 to provide support to the user.

As described above, tightening mechanism 111 comprises a pulley system to alter tension in left strap 107 and right strap 109. It is contemplated that pulling cord 119 mutually slides left sliding member 103 and right sliding member 105 towards one another to add tension in left strap 107 and right strap 109. As cord 119 is pulled, cord 119 travels around the pulleys (e.g., first pulley 115, second pulley 117, etc.) of the pulley system, which rotate as left sliding member 103 and right sliding member 105 slide along back support body 113 towards one another.

Tension can be removed in left strap 107 and right strap 109 by releasing cord 119 to mutually slide left sliding member 103 and right sliding member 105 along back support body 113 away from one another. Once cord 119 is released, it is contemplated that left strap 107 and right strap 109 transition from a stretched to a relaxed position and drive left sliding member 103 and right sliding member 105 to move away from one another.

Figure 5:
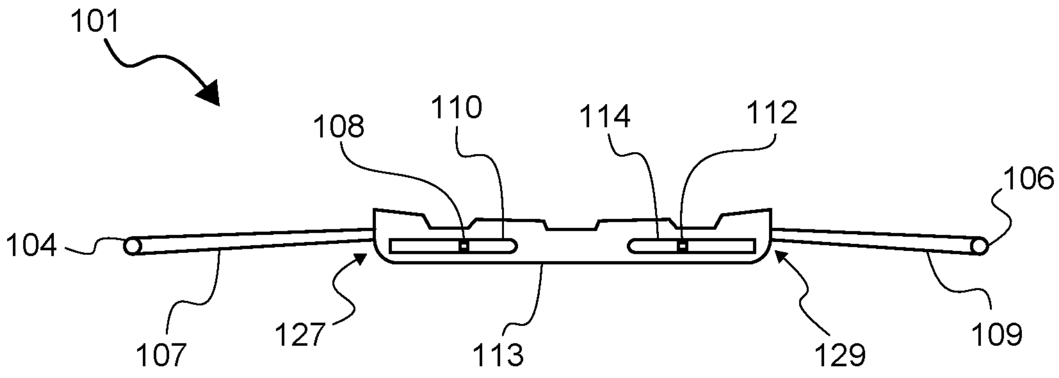
FIG. 5 is another top view of the movable back support of FIG. 1.

As left sliding member 103 slides along back support body 113, a projection 108 of left sliding member 103 slides within a second slot 110 of back support body 113 as shown in FIGS. 3 and 5. Projection 108 abuts one end of second slot 110 as shown in FIG. 3 to thereby prevent left sliding member 103 from sliding out of back support body 113. Additionally, right sliding member 105 comprises a projection 112 that slides within a third slot 114 of back support body 113 as right sliding member 105 slides along back support body 113. Projection 112 abuts one end of third slot 114 as shown in FIG. 3 to thereby prevent right sliding member 105 from sliding out of back support body 113.

Pull tab 121 can be used to pull or release cord 119 as desired by a user. It is contemplated that pull tab 121 can be coupled to a portion of wheelchair 100 to fix a tension in left strap 107 and right strap 109. For example, pull tab 121 can comprise hook and loop fasteners that couple to hook and loop fasteners on a portion of wheelchair 100. Pull tab 121 can be pulled to provide a desired tension in left strap 107 and right strap 109 and coupled to the portion of wheelchair 100 to fix the tension. Once uncoupled, tension is released in left strap 107 and right strap 109 causing left sliding member 103 and right sliding member 105 to move away from one another. Additionally or alternatively, it is contemplated that tension mechanism 111 comprises a mechanical stop that fixes a tension in left strap 107 and 109.

Figure 6:
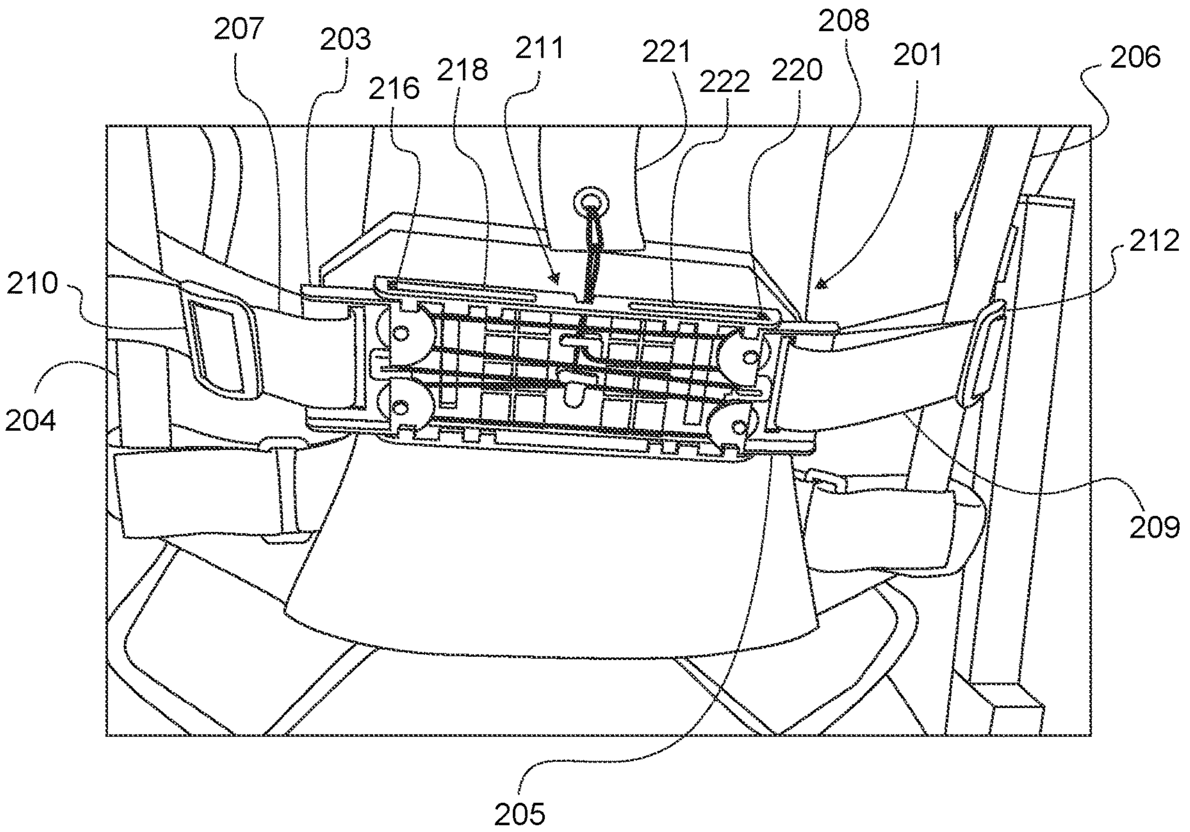
FIG. 6 is a rear view of an embodiment of a seat having a movable back support attached to left and right rails of the seat.

A movable back support having a pull tab that couples a portion of a seat is shown in FIG. 6. Movable back support 201 has many of the same components of movable back support 101. For example, movable back support 201 comprises a left sliding member 203, a right sliding member 205, a left strap 207, a right strap 209, and a tightening mechanism 211 configured to mutually slide left sliding member 203 and right sliding member 205 to thereby alter tension in left strap 207 and right strap 209. Left strap 207 extends between left sliding member 203 and a left rail 204 of the seat, and right strap 209 extends between right sliding member 205 and a right rail 206 of the seat.

Tightening mechanism 211 comprises a pulley system having a first set of pulleys coupled to left sliding member 203, a second set of pulleys coupled to right sliding member 205, and a cord at least partially wrapped around the first and second set of pulleys. The pulley system further comprises a pull tab 221 coupled to the cord. Pull tab 221 is configured to couple to a back portion 208 of the seat. FIG. 6 shows pull tab 221 coupled to back portion 208 of the seat. It is contemplated that pull tab 221 comprises hook and loop fasteners that couple hook and loop fasteners of back portion 208 of the seat. Pull tab 221 can couple back portion 208 through other couplings, such as through use of magnets and adhesives.

Figure 7:
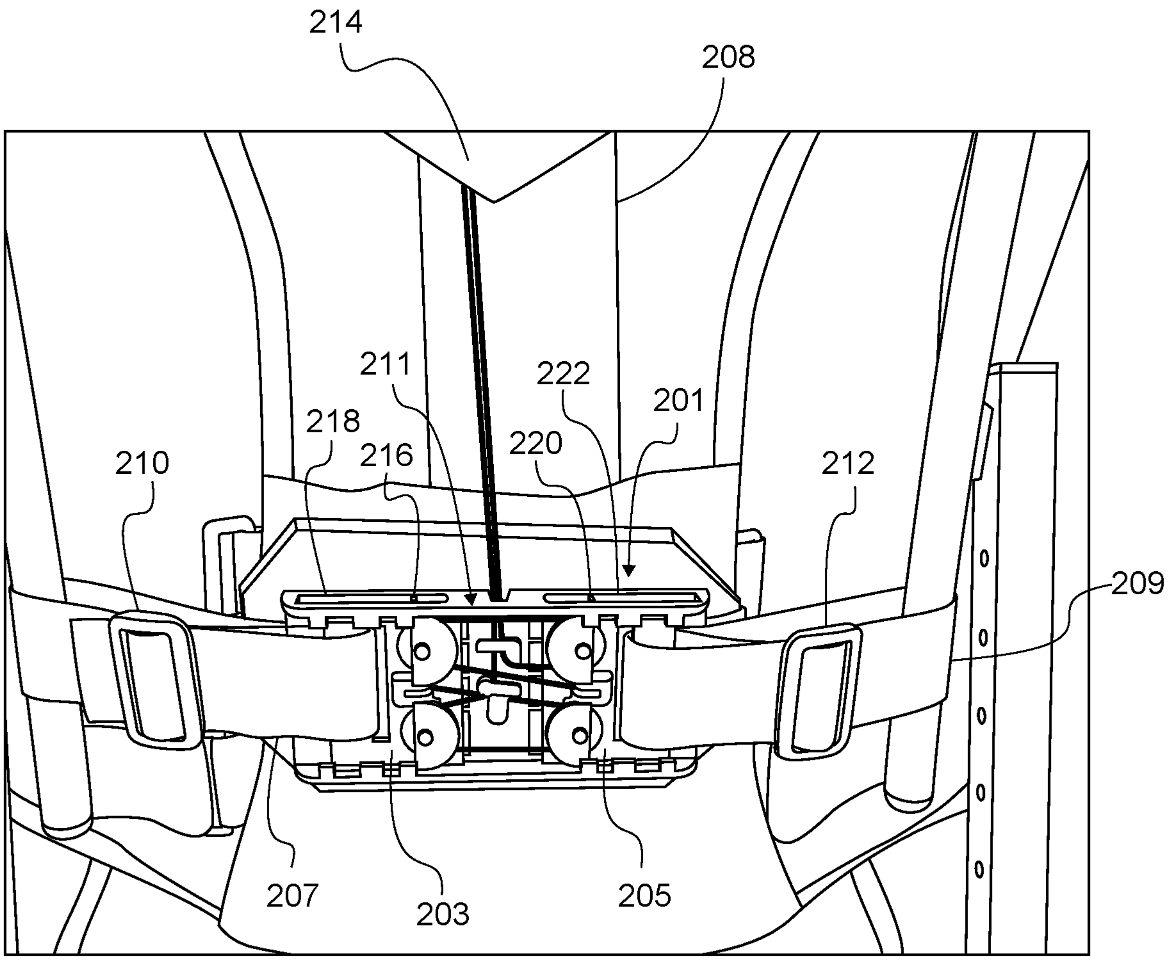
FIG. 7 is another rear view of the seat of FIG. 6 having the movable back support.

Back portion 208 of the seat can comprise a pocket 214 sized and dimensioned to receive pull tab 221 as shown in FIG. 7. It is contemplated that pull tab 221 can be pulled to provide a desired tension in left strap 207 and right strap 209. Once the desired tension is reached, pull tab 221 is placed into pocket 214 to fix the tension. Tension can be released in left strap 207 and right strap 209 by removing pull tab 221 from pocket 214.

Movable back support 201 can be moved in many different axes and fixed in a position to provide the support needed by the user. Similar to movable back support 101, movable back support 201 can comprise left and right adjustment mechanisms to lengthen or shorten the left strap 207 and right strap 209, respectively. For example, movable back support 201 can comprise a left buckle 210 and a right buckle 212 to lengthen or shorten left strap 207 and right strap 209, respectively.

As left sliding member 203 slides, a projection 216 of left sliding member 203 slides within a first slot 218 as shown in FIGS. 6-7. Projection 216 abuts one end of first slot 218 as shown in FIG. 6 to thereby prevent left sliding member 203 from sliding out. Additionally, right sliding member 205 comprises a projection 220 that slides within a second slot

222 as right sliding member 205 slides. Projection 220 abuts one end of second slot 222 as shown in FIG. 6 to thereby prevent right sliding member 205 from sliding out.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms “comprises” and “comprising” should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A movable back support for use with a seat having a backrest and left and right rails, comprising:

left and right sliding members;

a left strap extending between the left sliding member and the left rail, and configured to be height-adjustable along the left rail;

a right strap extending between the right sliding member and the right rail, and configured to be height-adjustable along the right rail; and a tightening mechanism configured to mutually slide the left and right sliding members and thereby alter tension in the left and right straps.

2. The movable back support of claim 1, wherein the left and right sliding member each comprise a slot, and further wherein the left strap extends through the slot of the left sliding member and the right strap extends through the slot of the right sliding member.

3. The movable back support of claim 1, wherein one or more of the left and right straps is elastic.

4. The movable back support of claim 1, wherein one or more of the left and right straps is a band.

5. The movable back support of claim 1, wherein one or more of the left and right straps is a belt having a length-adjustable mechanism configured to lengthen or shorten the belt.

6. The movable back support of claim 5, wherein the length-adjustable mechanism is a buckle.

7. The movable back support of claim 1, wherein the tightening mechanism is a pulley system.

8. The movable back support of claim 7, wherein the pulley system comprises a first pulley coupled to the left sliding member, a second pulley coupled to the right sliding member, and a cord at least partially wrapped around the first and second pulleys.

9. The movable back support of claim 8, wherein the pulley system comprises a pull tab coupled to the cord.

10. The movable back support of claim 1, further comprising a back support body having left and right slots, and wherein the left sliding member is configured to slide at least partially within the left slot, and the right sliding member is configured to slide at least partially within the right slot.

11. The movable back support of claim 1, further comprising a back support body sized and dimensioned as a lumbar support.

12. A wheelchair having left and right backrest rails, the wheelchair comprising the movable back support of claim 1 movably coupled to the left and right backrest rails.

* * * * *